(12) United States Patent
Aibara

(10) Patent No.: US 12,043,111 B2
(45) Date of Patent: Jul. 23, 2024

(54) WORK VEHICLE

(71) Applicant: ISEKI & CO., LTD., Ehime-ken (JP)

(72) Inventor: Kento Aibara, Ehime-ken (JP)

(73) Assignee: ISEKI & CO., LTD., Ehime-ken (JP)

( * ) Notice: Subject to any disclaimer, the term of this patent is extended or adjusted under 35 U.S.C. 154(b) by 0 days.

(21) Appl. No.: 18/193,601

(22) Filed: Mar. 30, 2023

(65) Prior Publication Data

US 2023/0322074 A1 Oct. 12, 2023

(30) Foreign Application Priority Data

Apr. 6, 2022 (JP) ................................. 2022-063256

(51) Int. Cl.
*B60K 25/06* (2006.01)
*B60K 25/02* (2006.01)

(52) U.S. Cl.
CPC .............. *B60K 25/02* (2013.01); *B60K 25/06* (2013.01); *B60K 2025/065* (2013.01); *B60Y 2300/1888* (2013.01); *B60Y 2300/423* (2013.01)

(58) Field of Classification Search
CPC ........ B60K 25/00; B60K 25/02; B60K 25/06; B60K 17/28; B60K 2025/065; B60Y 2200/221; B60Y 2300/1888; B60Y 2300/423; B60W 30/1888
USPC ...................................... 180/53.1, 53.7, 53.8
See application file for complete search history.

(56) References Cited

U.S. PATENT DOCUMENTS

| | | | | |
|---|---|---|---|---|
| 3,984,967 A * | 10/1976 | Jones | ..................... | A01D 34/64 56/11.8 |
| 3,999,643 A * | 12/1976 | Jones | ................. | A01D 34/6806 192/3.56 |
| 7,313,914 B1 * | 1/2008 | Reid | ..................... | F16H 61/437 60/487 |
| 2015/0327426 A1 * | 11/2015 | Kato | ....................... | F16D 28/00 192/84.1 |
| 2021/0039711 A1 * | 2/2021 | Reichert | ........... | B60W 30/1819 |

FOREIGN PATENT DOCUMENTS

| | | | | |
|---|---|---|---|---|
| JP | 2005119466 A | * | 5/2005 | |
| JP | 2010172306 A | * | 8/2010 | |
| JP | 2010172306 A | * | 11/2013 | |
| JP | 2020096558 A | * | 6/2020 | |
| JP | 2021024330 | | 2/2021 | |

* cited by examiner

*Primary Examiner* — Keith J Frisby
(74) *Attorney, Agent, or Firm* — JCIPRNET

(57) ABSTRACT

To provide a work vehicle that does not include a forward-reverse lever and is capable of stopping transmission of drive to a PTO shaft at a low cost when the vehicle is stopped or is moving backward. A work vehicle includes: a PTO shaft configured to transmit power to a work machine; a transmission; a forward pedal to be operated to move a traveling vehicle body forward; a switch configured to determine whether the forward pedal is operated; and a PTO clutch configured to switch the power to the PTO shaft to a non-transmission state when it is determined that the forward pedal is not operated based on a determination result of the switch. The forward pedal is provided on one of left and right sides of the transmission, and the switch is provided on the other of the left and right sides of the transmission.

2 Claims, 8 Drawing Sheets

WORK VEHICLE

CROSS-REFERENCE TO RELATED APPLICATION

This application claims the priority benefit of Japanese application serial no. 2022-063256, filed on Apr. 6, 2022. The entirety of the above-mentioned patent application is hereby incorporated by reference herein and made a part of this specification.

BACKGROUND OF THE INVENTION

1. Field of the Invention

The present invention relates to a work vehicle such as a tractor, a seedling transplantor, and a lawn mower.

2. Description of Related Art

In a work vehicle such as a tractor or a seedling transplantor that performs work by transmitting drive to a work machine by a power take off (PTO) shaft, a technique described in PTL 1 is known.

PTL 1 describes a technique in which, in a work vehicle for spreading a snow melting agent, a forward movement and a backward movement are switched by a forward-reverse lever, rotation of a drive wheel can be detected by a rotation speed sensor, and transmission of drive to a PTO shaft is restricted when the vehicle is stopped (when a rotation speed of the drive wheel is zero) or when the forward-reverse lever is operated to a reverse side, and thus the work machine is operated by transmitting the drive to the PTO shaft only during the forward movement.

CITATION LIST

Patent Literature

PTL 1: JP2021-24330A

SUMMARY OF THE INVENTION

In the related-art technique described in PTL 1, determination on the operation of the forward-reverse lever to the reverse side is performed, but the work vehicle may have a configuration in which forward and reverse operations are performed by a forward pedal and a reverse pedal instead of including the forward-reverse lever, and the technique cannot be implemented in a configuration not including the forward-reverse lever.

In addition, in the work vehicle capable of moving forward and backward, a rotation speed of an engine is highly important to be displayed in relation to work, but a vehicle speed that varies due to a speed change or a switch between on and off of a clutch is less important to be displayed than the rotation speed of the engine. Accordingly, there are work vehicles that do not have a function of displaying the vehicle speed, and there are also work vehicles that do not include a vehicle speed sensor that detects rotation of an axle. Therefore, in a work vehicle that does not include a relatively expensive vehicle speed sensor, it is not possible to implement the configuration in PTL 1 in which a vehicle speed is detected and the transmission of the drive to the PTO shaft is restricted.

A technical object of the invention is to provide a work vehicle that does not include a forward-reverse lever and is capable of stopping transmission of drive to a PTO shaft at a low cost when the vehicle is stopped or is moving backward.

The above problems are solved by the following solution means according to the invention.

The invention described in claim 1 is a work vehicle (1) including:
a PTO shaft (141) configured to transmit power to a work machine (18);
a transmission (201);
a forward pedal (202) to be operated to move a traveling vehicle body (1a) forward;
a switch (213) configured to determine whether the forward pedal (202) is operated; and
a PTO clutch (221) configured to switch the power to the PTO shaft (141) to a non-transmission state when it is determined that the forward pedal (202) is not operated based on a determination result of the switch (213), in which
the forward pedal (202) is provided on one of left and right sides of the transmission (201), and
the switch (213) is provided on the other of the left and right sides of the transmission (201).

The invention described in claim 2 is the work vehicle (1) according to claim 1 further including:
an interlocking shaft (204) configured to rotate in conjunction with an operation of the forward pedal (202), in which
the switch (213) is configured to perform detection as the interlocking shaft (204) rotates, and
the interlocking shaft (204) is provided across the left and right sides of the transmission (201).

Advantageous Effect

According to the invention, in the work vehicle (1) including the forward pedal (202) and a reverse pedal (203) and not including a forward-reverse lever, it is possible to determine, even when an expensive vehicle speed sensor is not provided, a forward movement of the work vehicle (1) using a relatively low-cost switch and to stop the transmission of drive to the PTO shaft.

In addition, the switch can be compactly installed, and a space can be saved as a whole.

DESCRIPTION OF EMBODIMENTS

Figure 1:
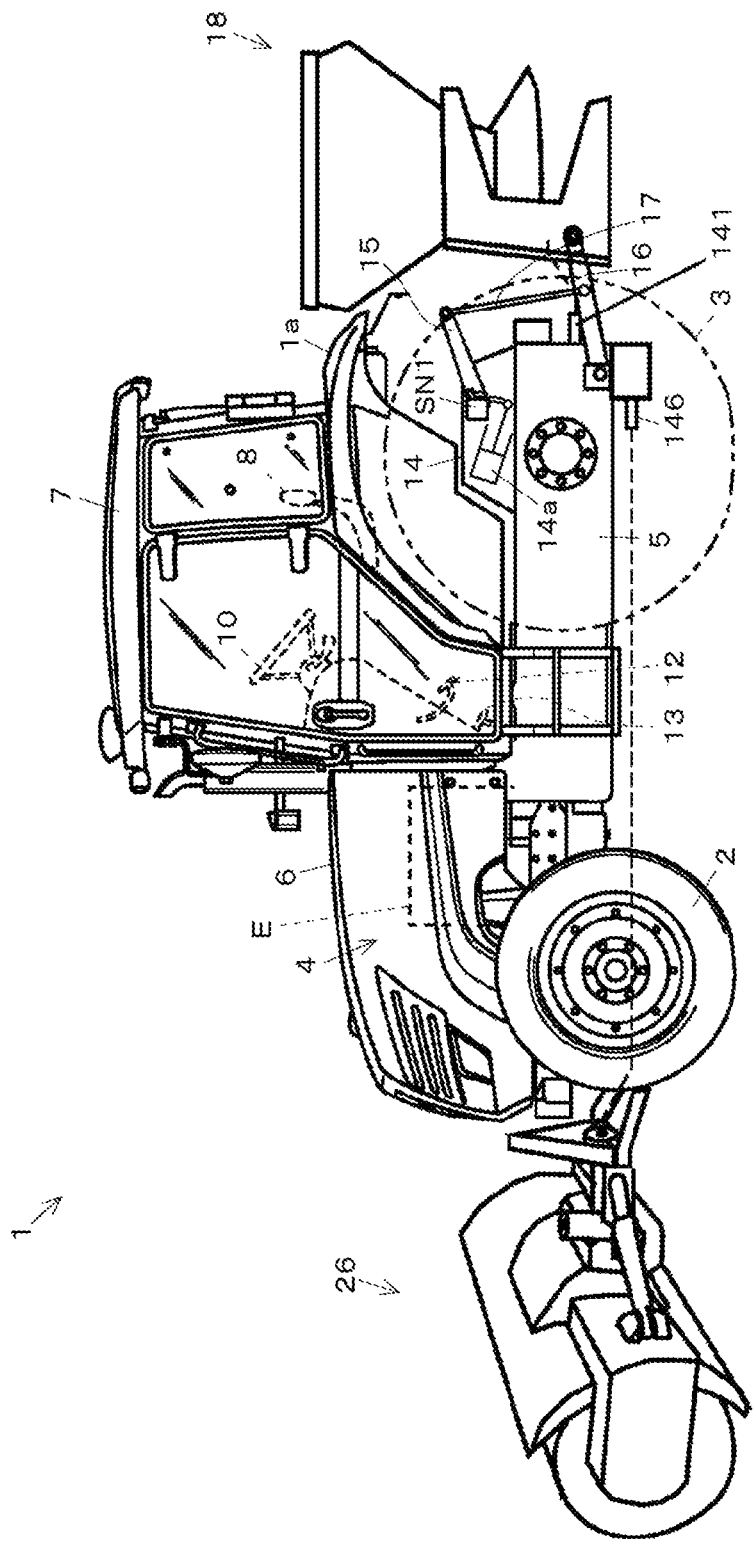
FIG. 1 is a view illustrating a tractor as an example of a work vehicle according to an embodiment.

FIG. 1 is a view illustrating a tractor as an example of a work vehicle according to an embodiment.

In FIG. 1, a snow removal tractor 1 as an example of the work vehicle according to the invention includes front wheels 2 and 2 and rear wheels 3 and 3 at front and rear portions of a traveling vehicle body 1a, and is configured to appropriately decrease rotational power of an engine E, which is mounted in an engine room 4 at the front portion of the traveling vehicle body, by a transmission in a transmission case 5 and transmit the rotational power to the front wheels 2 and 2 and the rear wheels 3 and 3. The engine room 4 is covered with a bonnet 6. A work machine such as an agent spreading machine 18 for spreading agents (a snow melting agent, an antifreezing agent, or the like) on a road surface behind the tractor 1 is attached to the rear portion of the vehicle body of the tractor 1, and the work machine is driven by power transmitted by a rear PTO shaft 141. A snow removal brush 26 as an example of the work machine is attached to the front portion of the vehicle body. The snow removal brush 26 is implemented by a rotary brush that flicks off snow on the road surface to lateral sides. The snow removal brush 26 is driven by power transmitted by a mid PTO shaft 146.

In the present specification, left and right of the tractor 1 in a forward direction are referred to as a left side and a right side respectively, the forward direction is referred to as a front side, and a reverse direction is referred to as a rear side.

A cabin 7 is supported on an upper portion of the traveling vehicle body 1a. Inside the cabin 7, a driver seat 8 is disposed at a position on an upper portion of the transmission case 5, and a steering wheel 10, a parking brake (not illustrated), and the like are disposed in front of the driver seat 8. A display panel such as a speed meter (not illustrated), various switches (not illustrated) for operations, and the like are disposed in front of the driver seat 8. Traveling operation tools such as a brake pedal 12 and accelerator pedals 13 including a forward pedal and a reverse pedal are disposed at a front lower portion of the driver seat 8.

In FIG. 1, a hydraulic cylinder case 14 is provided above a rear portion of the transmission case 5, and lift arms 15 and 15 are pivotally attached to both left and right sides of the hydraulic cylinder case 14. The lift arms 15 and 15 and lower links 16 and 16 are coupled with lift rods 17 and 17 interposed therebetween, respectively, and the agent spreading machine 18 as an example of the work machine is coupled to rear portions of the lower links 16 and 16.

When hydraulic oil is supplied to a hydraulic cylinder 14a accommodated in the hydraulic cylinder case 14, the lift arms 15 and 15 are pivoted upward, and the work machine (the agent spreading machine) 18 is raised via the lift rods 17 and 17, the lower links 16 and 16, and the like. In contrast, when the hydraulic oil in the hydraulic cylinder 14a is discharged into the transmission case 5 which also serves as a hydraulic tank, the lift arms 15 and 15 descend.

A position sensor SN1 for detecting an inclination angle of each lift arm 15, that is, an up and down movement of the work machine 18 is disposed at a base end portion of the lift arm 15.

As the work machine attached to the rear portion of the traveling vehicle body 1a, that is, the work machine to which drive is transmitted from the rear PTO shaft 141, examples include, in addition to the agent spreading machine, agricultural work machines such as a rotary cultivator, a plow, a seeding machine, a seedling transplantor, a fertilizer spreading machine, and a pesticide spraying machine which are used for agricultural work.

As the work machine attached to the front portion of the traveling vehicle body 1a, that is, the work machine to which drive is transmitted from the mid PTO shaft 146, in addition to the snow removal brush 26, a mower for lawn mowing, a loader capable of accommodating and carrying a sample, grass, sand, crop, or the like in a bucket, and the like can be used.

(Descriptions of Configurations of Pedal, Engine, and Main Transmission)

Figure 2:
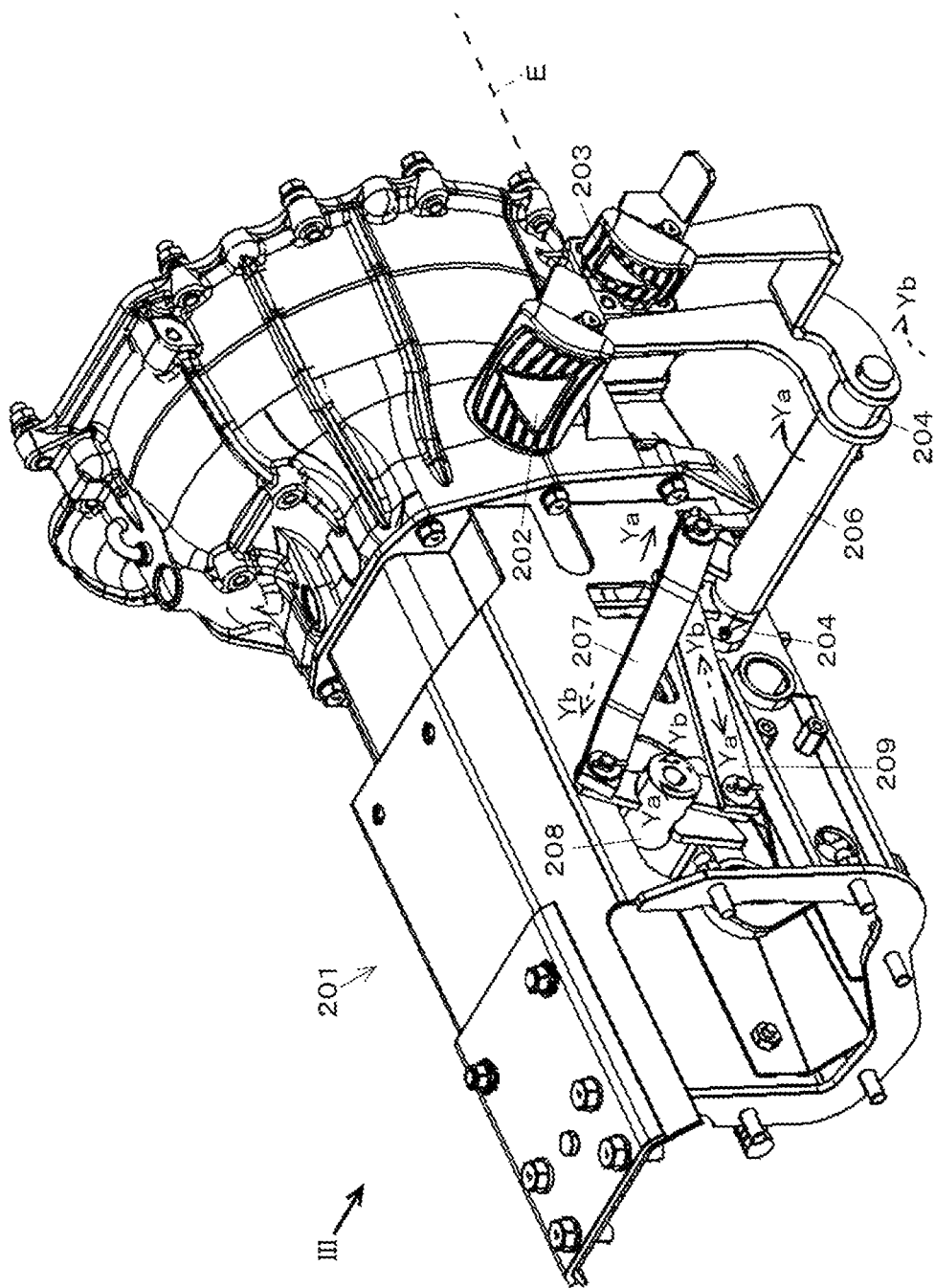
FIG. 2 is a view illustrating a main part including an engine, a main transmission, and pedals according to the embodiment.

FIG. 2 is a view illustrating a main part including an engine, a main transmission, and pedals according to the embodiment.

Figure 3:
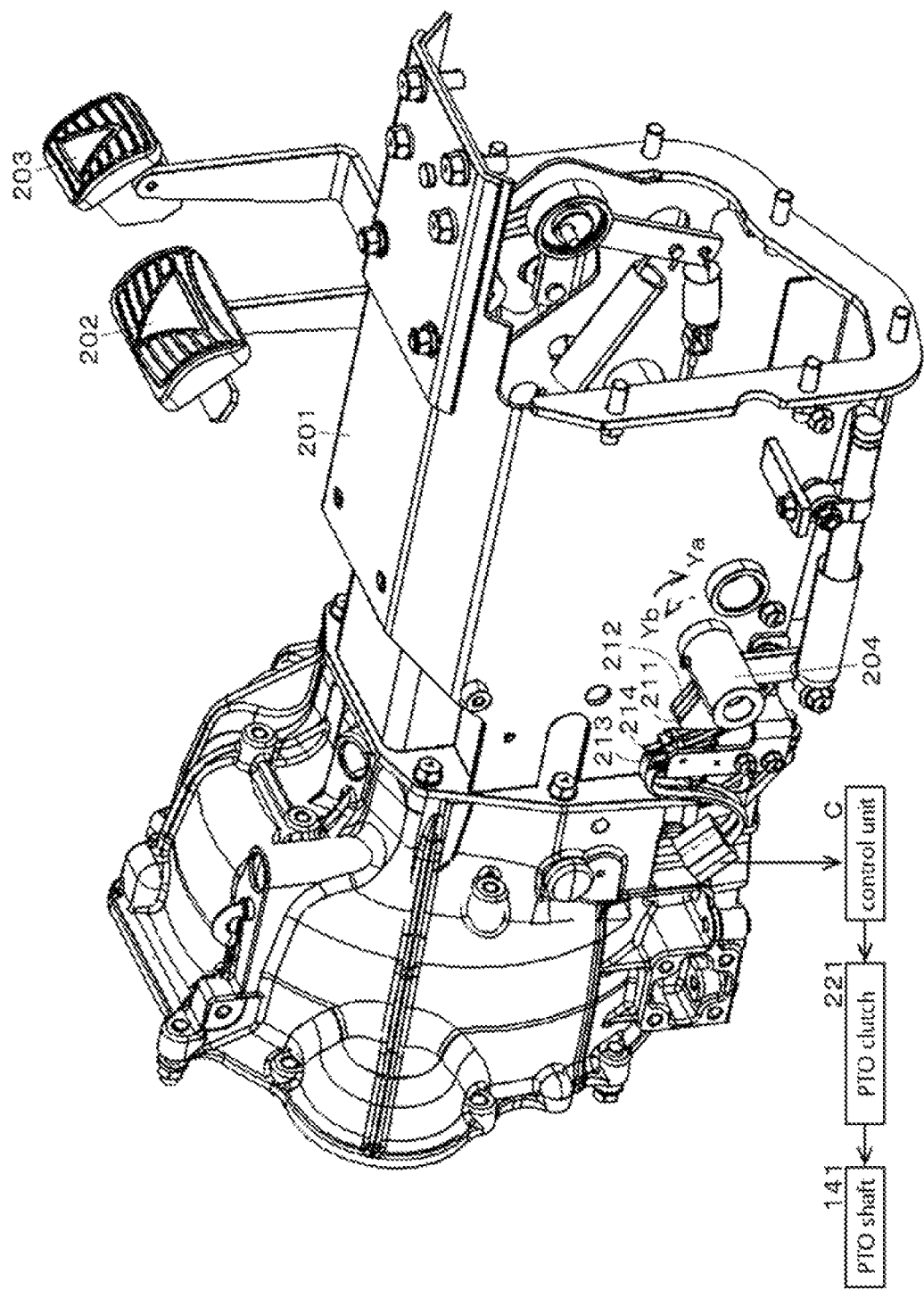
FIG. 3 is a perspective view seen from a direction of an arrow III in FIG. 2.

FIG. 3 is a perspective view seen from a direction of an arrow III in FIG. 2.

Figure 4:
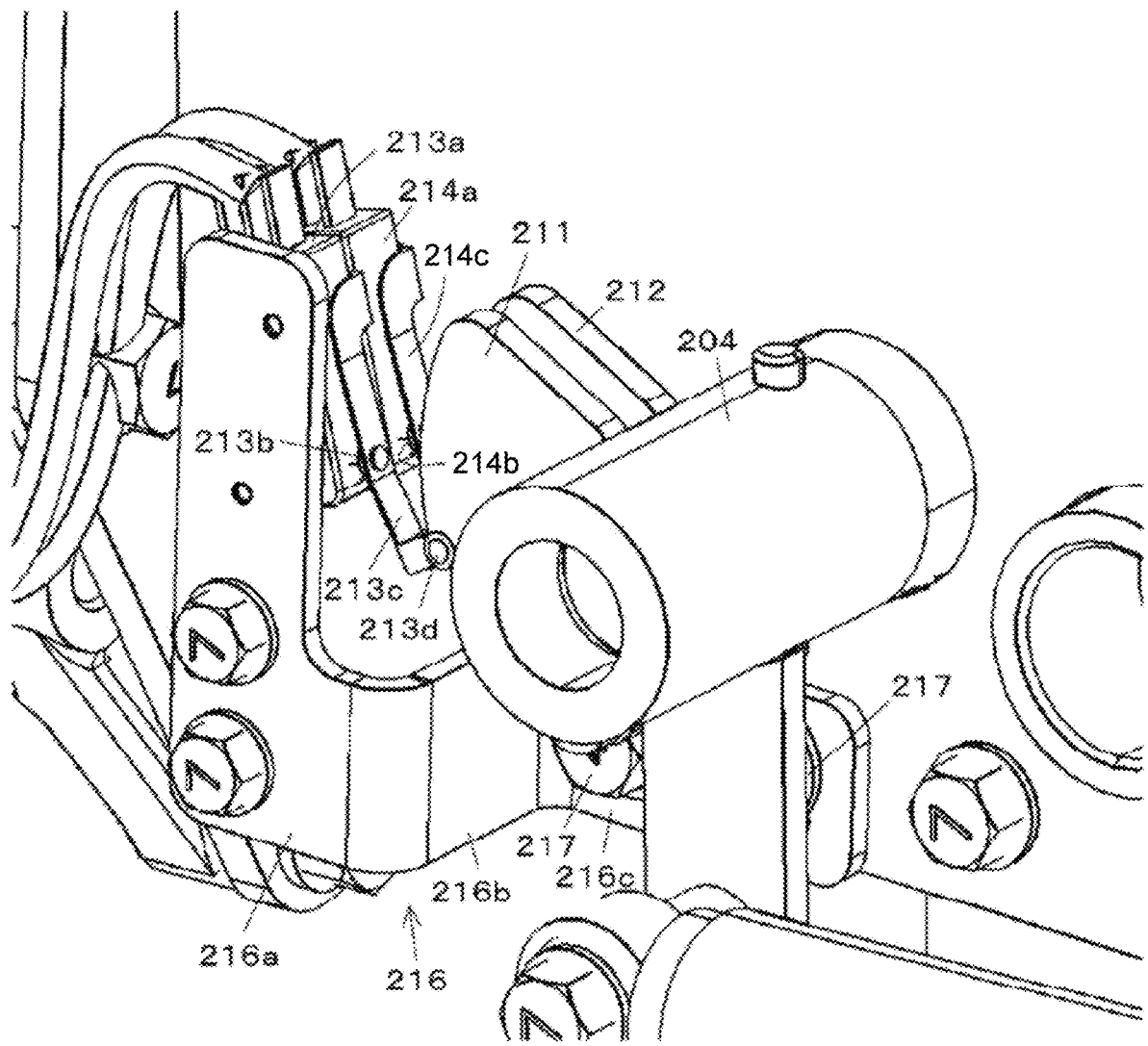
FIG. 4 is an enlarged view of switches in FIG. 2.

FIG. 4 is an enlarged view of switches in FIG. 2.

Figure 5:
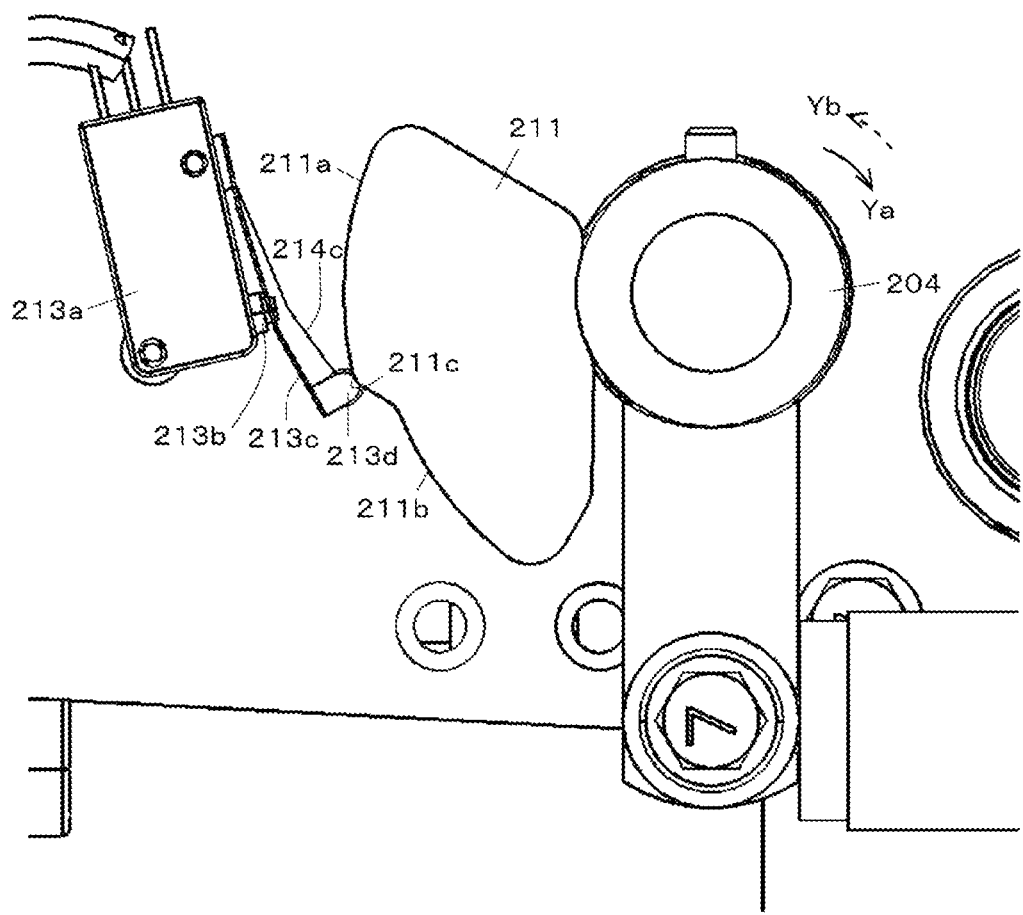
FIG. 5 is a view illustrating a switch for forward movement detection.

FIG. 5 is a view illustrating a switch for forward movement detection.

Figure 6:
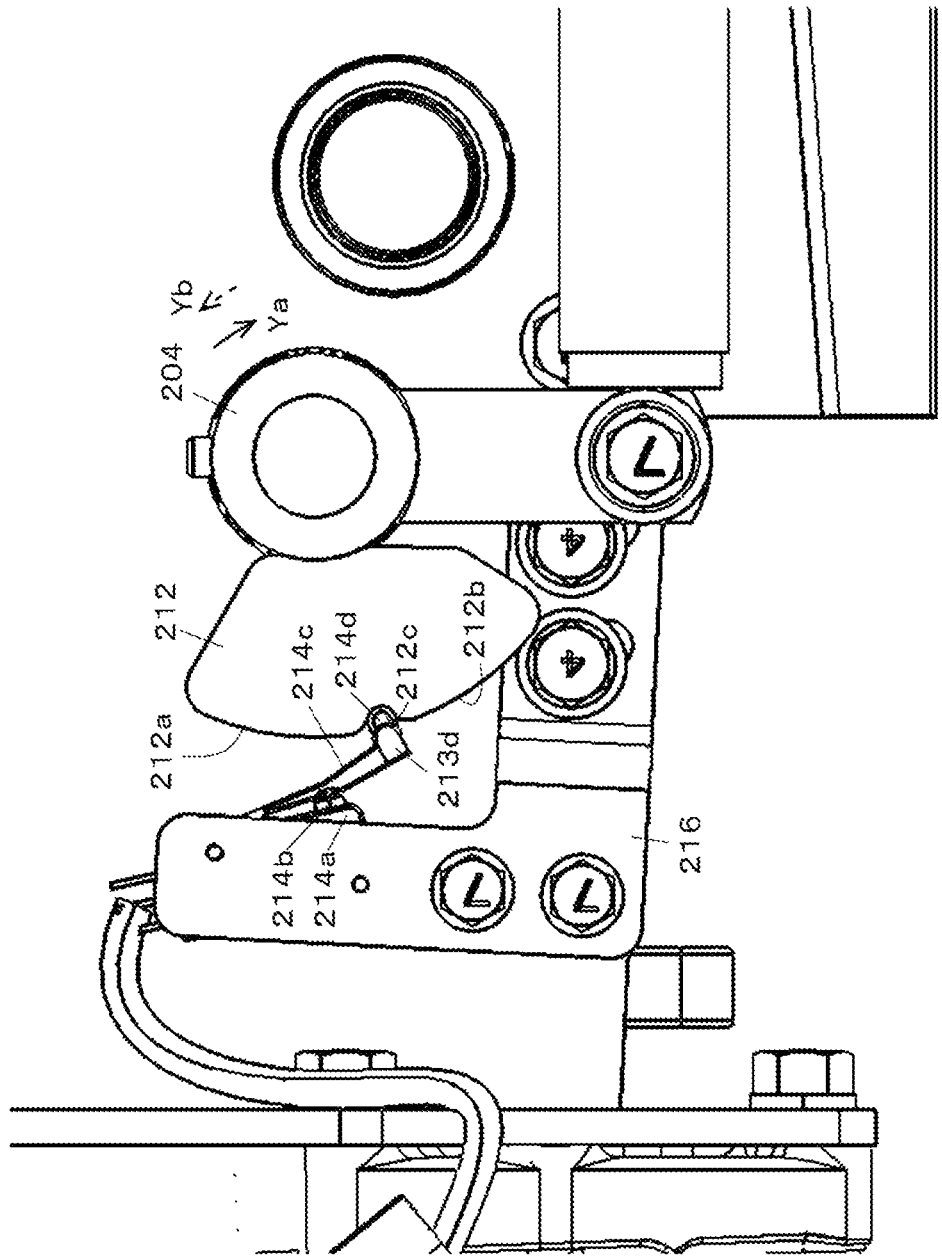
FIG. 6 is a view illustrating a switch for neutral detection.

FIG. 6 is a view illustrating a switch for neutral detection.

Figure 7:
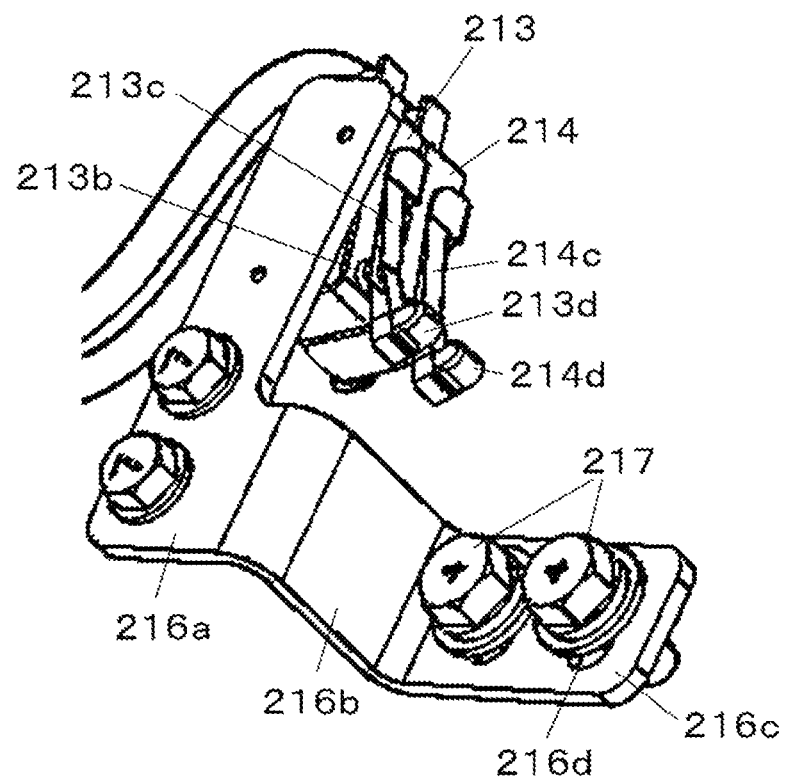
FIG. 7 is a perspective view of the switches and an attachment plate.

FIG. 7 is a perspective view of the switches and an attachment plate.

Figure 8:
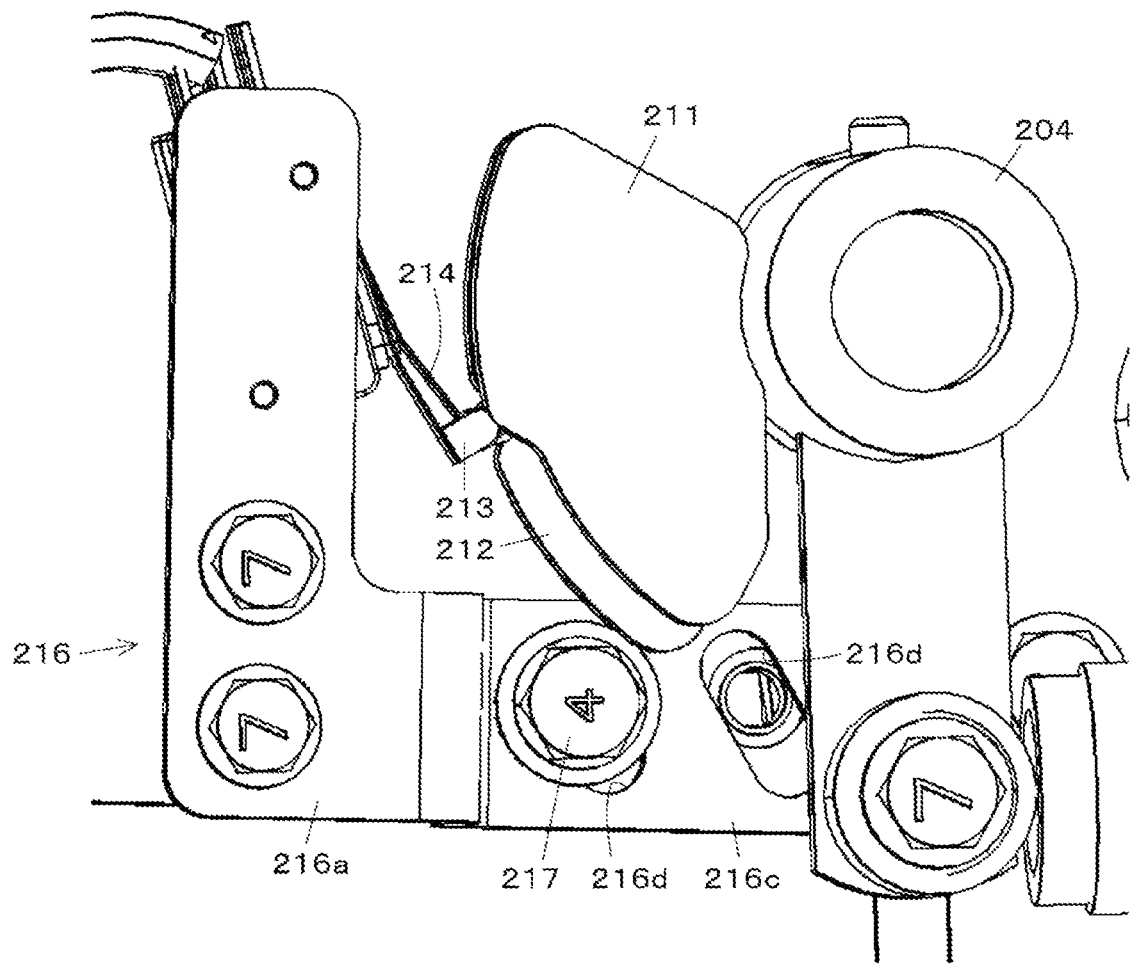
FIG. 8 is a view illustrating an attachment hole of the attachment plate.

FIG. 8 is a view illustrating an attachment hole of the attachment plate.

In FIGS. 2 and 3, in the tractor 1 according to the embodiment, a hydraulic static transmission (HST) 201 as an example of the main transmission is disposed at a rear portion of the engine E. In FIGS. 2 to 8, illustration of portions and components not related to a description of the invention is omitted.

A forward pedal 202 and a reverse pedal 203 are disposed on a right side of the HST 201.

The forward pedal 202 is a member for a driver to perform an operation by depressing with a foot to move the tractor 1 forward. The reverse pedal 203 is a member for the driver to perform an operation by depressing with the foot to move the tractor 1 backward.

A base end portion of the reverse pedal 203 is supported by a right end of an interlocking shaft 204. The interlocking shaft 204 penetrates the HST 201 in a left-right direction and is rotatably supported by the HST 201.

In FIG. 2, a base end portion of the forward pedal 202 is supported by a right end portion of an interlocking sleeve 206. The interlocking sleeve 206 has a cylindrical shape extending in the left-right direction, and the interlocking shaft 204 penetrates through an inside of the interlocking sleeve 206. One end portion of a forward link arm 207 is rotatably coupled to a left end portion of the interlocking sleeve 206. The other end portion of the forward link arm 207 is coupled to a trunnion shaft 208 of the HST 201.

The trunnion shaft 208 is a known member for changing an inclination angle of a swash plate (not illustrated) inside the HST 201. By controlling an inclination angle of the trunnion shaft 208, it is possible to move forward (forward rotation) or move backward (reverse rotation) and change a speed (change of a rotational speed).

One end portion of a reverse link arm 209 is rotatably coupled to the interlocking shaft 204 at a position leftward than the left end portion of the interlocking sleeve 206. The other end portion of the reverse link arm 209 is coupled to the trunnion shaft 208 of the HST 201.

In FIGS. 3 to 6, a forward movement detection cam 211 as an example of an interlocking portion and a neutral detection cam 212 as an example of a second interlocking portion are disposed at a left end portion of the interlocking shaft 204. The forward movement detection cam 211 and the neutral detection cam 212 are disposed adjacent to each other in an axial direction of the interlocking shaft 204. Therefore, an installation space can be saved as compared with a case where the two cams 211 and 212 are installed apart from each other.

In FIG. 5, the forward movement detection cam 211 according to the embodiment is a substantially fan-shaped plate member, and a diameter from the interlocking shaft 204 is formed such that an upper portion 211a has a diameter larger than that of a lower portion 211b.

In FIG. 6, the neutral detection cam 212 according to the embodiment is a substantially fan-shaped plate member, a diameter from the interlocking shaft 204 is formed such that an upper portion 212a and a lower portion 212b have the same diameter and an intermediate portion 212c between the upper portion 212a and the lower portion 212b has a diameter smaller than that of the upper portion 212a and the lower portion 212b. Therefore, the neutral detection cam 212 has a fan shape in which a portion at the intermediate portion 212c is recessed with respect to a peripheral direction of the neutral detection cam 212.

A forward movement detection switch 213 as an example of a switch and a neutral detection switch 214 as an example of a second switch are disposed in front of the cams 211 and 212.

The forward movement detection switch 213 and the neutral detection switch 214 are disposed adjacent to each other in the axial direction of the interlocking shaft 204 so as to correspond to the forward movement detection cam 211 and the neutral detection cam 212.

The forward movement detection switch 213 includes a box-shaped switch main body 213a. A contact portion 213b protruding rearward is provided on a lower portion of a rear surface of the switch main body 213a. A forward plate spring portion 213c is disposed on a rear side of the switch main body 213a, and an upper end of the forward plate spring portion 213c is supported by the switch main body 213a. A forward cam follower 213d that can be brought into contact with a front surface (outer peripheral surface) of the forward movement detection cam 211 is provided at a lower end of the forward plate spring portion 213c.

The forward cam follower 213d is brought into contact with the outer peripheral surface of the forward movement detection cam 211 by an elastic force of the forward plate spring portion 213c. In the embodiment, a position, a shape, and a size of each member are set such that the forward plate spring portion 213c is not in contact with the contact portion 213b in a state in which the forward cam follower 213d is in contact with the small-diameter lower portion 211b, and the forward plate spring portion 213c is in contact with the contact portion 213b in a state in which the forward cam follower 213d is in contact with the large-diameter upper portion 211a. When the forward plate spring portion 213c and the contact portion 213b are in contact with each other, the forward plate spring portion 213c and the contact portion 213b are energized to turn on the forward movement detection switch 213. When the forward plate spring portion 213c and the contact portion 213b are not in contact with each other, the forward movement detection switch 213 is turned off. The positions and the like of the members are set such that the forward cam follower 213d is in contact with a boundary portion 211c between the upper portion 211a and the lower portion 211b in a state in which the forward pedal 202 and the reverse pedal 203 are not depressed (a neutral state, a non-drive transmission state). A diameter of the boundary portion 211c is the same as that of the upper portion 211a and larger than that of the lower portion 211b.

The neutral detection switch 214 has a similar configuration as the forward movement detection switch 213, and includes a switch main body 214a, a contact portion 214b, a neutral plate spring portion 214c, and a neutral cam follower 214d.

The neutral cam follower 214d is brought into contact with an outer peripheral surface of the neutral detection cam 212 by an elastic force of the neutral plate spring portion 214c. In the embodiment, a position, a shape, and a size of each member are set such that the neutral plate spring portion 214c is not in contact with the contact portion 214b in a state in which the neutral cam follower 214d is in contact with the small-diameter intermediate portion 212c, and the neutral plate spring portion 214c is in contact with the contact portion 214b in a state in which the neutral cam follower 214d is in contact with the large-diameter upper portion 212a or lower portion 212b. When the neutral plate spring portion 214c and the contact portion 214b are in contact with each other, the neutral plate spring portion 214c and the contact portion 214b are energized to turn on the neutral detection switch 214. When the neutral plate spring portion 214c and the contact portion 214b are not in contact with each other, the neutral detection switch 214 is turned off. The positions and the like of the members are set such that the neutral cam follower 214d is in contact with the intermediate portion 212c in a state in which the forward pedal 202 and the reverse pedal 203 are not depressed (the neutral state, the non-drive transmission state).

In FIGS. 4 to 8, the forward movement detection switch 213 and the neutral detection switch 214 are supported on a left side wall of the HST 201 via an attachment plate 216. The attachment plate 216 includes a plate-shaped switch support portion 216a, a connection portion 216b extending rightward from a lower end of the switch support portion 216a, and an attached portion 216c extending rearward from a right end of the connection portion 216b.

The forward movement detection switch 213 and the neutral detection switch 214 are supported by the switch support portion 216a. In the embodiment, the forward movement detection switch 213 and the neutral detection switch 214 having the similar configuration are disposed adjacent to each other, and as compared with a case where the two switches have different configurations or are disposed at separated positions, the two switches 213 and 214 can be supported by one attachment plate 216, the configuration can be simplified, costs can be reduced, and an installation space can also be saved.

A pair of front and rear attachment holes 216d are formed in the attached portion 216c. The attachment plate 216 is supported on the left side wall of the HST 201 by a screw 217 passing through each of the attachment holes 216d. As illustrated in FIG. 8, the attachment hole 216d according to the embodiment is an arc-shaped long hole along an arc centered on the interlocking shaft 204. Therefore, when the positions of the switches 213 and 214 are finely adjusted, a positional relationship around the interlocking shaft 204 is easily adjusted.

(Descriptions of Operation of Pedal and Movement of Each Portion)

In FIGS. 2 to 6, in the tractor 1 according to the embodiment, when neither the forward pedal 202 nor the reverse pedal 203 is depressed, the cam followers 213d and 214d are in contact with the boundary portion 211c and the intermediate portion 212c of the cams 211 and 212 respectively, the forward movement detection switch 213 is turned on, and the neutral detection switch 214 is turned off.

In FIG. 2, when the forward pedal 202 is depressed, the interlocking sleeve 206 rotates in a direction indicated by a solid arrow Ya in FIG. 2. As the interlocking sleeve 206 rotates, the forward link arm 207 moves in a direction of a solid arrow Ya, and the trunnion shaft 208 also rotates in a direction of a solid arrow Ya. Accordingly, the HST 201 outputs a rotational speed in the forward direction corresponding to a rotation amount of the trunnion shaft 208. As the trunnion shaft 208 rotates, the reverse link arm 209 also moves in a direction of a solid arrow Ya, and the interlocking shaft 204 rotates in a direction of a solid arrow Ya.

In FIG. 3, when the interlocking shaft 204 rotates in the direction of the solid arrow Ya, the two cams 211 and 212 also rotate in a direction of a solid arrow Ya. Therefore, the cam followers 213d and 214d are brought into contact with outer peripheral surfaces of the lower portions 211b and 212b of the cams 211 and 212 respectively, and both the forward movement detection switch 213 and the neutral detection switch 214 are turned off.

In FIG. 2, when the reverse pedal 203 is depressed, the interlocking shaft 204 rotates in a direction indicated by a dashed arrow Yb in FIG. 2. As the interlocking shaft 204 rotates, the reverse link arm 209 moves in a direction of a dashed arrow Yb, and the trunnion shaft 208 also rotates in a direction of a dashed arrow Yb. Accordingly, the HST 201 outputs a rotational speed in the reverse direction corresponding to a rotation amount of the trunnion shaft 208.

In FIG. 3, when the interlocking shaft 204 rotates in the direction of the dashed arrow Yb, the two cams 211 and 212 also rotate in a direction of a dashed arrow Yb. Therefore, the cam followers 213d and 214d are brought into contact with outer peripheral surfaces of the upper portions 211a and 212a of the cams 211 and 212 respectively, and both the forward movement detection switch 213 and the neutral detection switch 214 are turned on.

Accordingly, in the tractor 1 according to the embodiment, the forward movement detection switch 213 is turned off when the forward pedal 202 is depressed and a forward movement operation is performed, and the forward movement detection switch 213 is turned on when the reverse pedal 203 is depressed and a reverse movement operation is performed or in a neutral state in which neither the pedals 202 nor 203 is operated. The neutral detection switch 214 is turned off in the neutral state, and is turned on when both of the pedals 202 and 203 are operated (a forward moving state or a reverse moving state: a non-neutral state).

Therefore, based on detection results of the forward movement detection switch 213 and the neutral detection switch 214, it is possible to determine whether the tractor 1 is moving forward, moving backward, or in the neutral state (the drive is not transmitted) based on a combination of ON and OFF states of the two switches 213 and 214.

In the embodiment, the two switches including the forward movement detection switch 213 and the neutral detection switch 214 are used, but the neutral detection switch 214 and the neutral detection cam 212 are not necessarily required if it is only to determine whether the vehicle is moving forward, stopped, or moving backward. In the embodiment, the neutral state can be reliably detected by providing the neutral detection switch 214 and the neutral detection cam 212.

In addition, the upper portion 212a of the neutral detection cam 212 may be set to have a smaller diameter similar to that of the lower portion 211b of the forward movement detection cam 211, the neutral detection switch 214 may detect the neutral state, the forward movement, or the backward movement, and the forward movement/the backward movement/the neutral state may be determined based on a combination of the detection results of the two switches 213 and 214.

Further, regarding the shape (diameter of the fan shape) of the cams 211 and 212, a configuration for switching between the ON and OFF states as described above is described as an example, but is not limited thereto. For example, in the forward movement detection cam 211, the upper portion 211a and the boundary portion 211c may have a smaller diameter while the lower portion 211b may have a larger diameter, and in the neutral detection cam 212, the intermediate portion 212c may have a diameter larger than other portions.

In FIG. 3, a control unit C of the tractor 1 according to the embodiment switches a PTO clutch 221 to a non-transmission state based on the detection results of the switches 213 and 214 when the tractor 1 is not in the forward moving state (in the neutral state or the reverse moving state), that is, when the forward movement detection switch 213 is turned on or the neutral detection switch 214 is turned off. The PTO clutch 221 is a clutch that is disposed in a power transmission path from the engine E to the rear PTO shaft 141 and that switches between transmission and non-transmission of the power. Since the PTO clutch 221 is known in the related art, a detailed description thereof will be omitted.

Accordingly, in the tractor 1 not including a forward-reverse lever, a relatively expensive vehicle speed sensor is not required, and the transmission of the drive to the rear PTO shaft 141 when the tractor 1 is in the neutral state (when stopped) or is moving backward can be stopped with a relatively low-cost configuration such as the switches 213 and 214. Therefore, it is possible to prevent the agent from being sprayed over an unintended place due to an erroneous operation of the work machine when the work machine is moving backward or is stopped.

What is claimed is:

1. A work vehicle comprising:
   a PTO shaft configured to transmit power to a work machine;
   a transmission;
   a forward pedal to be operated to move a traveling vehicle body forward;
   a switch configured to determine whether the forward pedal is operated; and
   a PTO clutch configured to switch the power to the PTO shaft to a non-transmission state when it is determined that the forward pedal is not operated based on a determination result of the switch, wherein
   the forward pedal is provided on one of left and right sides of the transmission, and
   the switch is provided on the other of the left and right sides of the transmission.

2. The work vehicle according to claim 1, further comprising:
   an interlocking shaft configured to rotate in conjunction with an operation of the forward pedal, wherein
   the switch is configured to perform detection as the interlocking shaft rotates, and
   the interlocking shaft is provided across the left and right sides of the transmission.

* * * * *